United States Patent
Cuissard et al.

(10) Patent No.: US 12,550,042 B2
(45) Date of Patent: Feb. 10, 2026

(54) RECURSIVE UPDATING OF MAP SERVER ENTRIES

(71) Applicant: Cisco Technology, Inc., San Jose, CA (US)

(72) Inventors: Vincent Cuissard, Eteaux (FR); Amine Choukir, Ecublens (CH); Domenico Ficara, Essertines-sur-Yverd (CH); Shree Murthy, San Jose, CA (US); Simone Arena, Carrara (IT)

(73) Assignee: Cisco Technology, Inc., San Jose, CA (US)

( * ) Notice: Subject to any disclaimer, the term of this patent is extended or adjusted under 35 U.S.C. 154(b) by 451 days.

(21) Appl. No.: 18/068,898

(22) Filed: Dec. 20, 2022

(65) Prior Publication Data

US 2024/0205793 A1     Jun. 20, 2024

(51) Int. Cl.
  *H04W 40/24*     (2009.01)
  *G06F 16/23*     (2019.01)
  *G06F 16/29*     (2019.01)

(52) U.S. Cl.
  CPC ...... *H04W 40/248* (2013.01); *G06F 16/2379* (2019.01); *G06F 16/29* (2019.01)

(58) Field of Classification Search
  CPC ... H04W 40/248; G06F 16/2379; G06F 16/29
  See application file for complete search history.

(56) References Cited

U.S. PATENT DOCUMENTS

| | | | |
|---|---|---|---|
| 7,508,787 B2 * | 3/2009 | Doshi | H04W 24/00 370/328 |
| 10,630,660 B1 | 4/2020 | Kumar et al. | |
| 2008/0259788 A1 * | 10/2008 | Wang | H04W 40/24 370/328 |
| 2018/0310301 A1 | 10/2018 | Amini et al. | |
| 2021/0168125 A1 | 6/2021 | Vemulpali | |
| 2021/0185517 A1 | 6/2021 | Sanjay et al. | |
| 2022/0272033 A1 | 8/2022 | Jain et al. | |

FOREIGN PATENT DOCUMENTS

CA    2767863 A1 *   1/2011   ........... H04L 67/565

* cited by examiner

*Primary Examiner* — Cheikh T Ndiaye
(74) *Attorney, Agent, or Firm* — Lee & Hayes, P.C.

(57) ABSTRACT

A method of updating map server entries may include generating a map server database (DB) at a map server. The map server DB may include a plurality of relational fields for a plurality of entries. The method may further include, based at least in part on a first entry of the plurality of entries being updated including a change to a first network location of the first entry, updating a second network location of a second entry of the plurality of entries that has a relation with the first entry based on the relational fields.

20 Claims, 10 Drawing Sheets

RECURSIVE UPDATING OF MAP SERVER ENTRIES

TECHNICAL FIELD

The present disclosure relates generally to computer networks. Specifically, the present disclosure relates to systems and methods for providing recursive control plane updates for wireless mesh support in a fabric network.

BACKGROUND

Computing networks such as fabric overlay networks may be deployed in an enterprise network as they provide simple policy-based segmentation and host mobility. At the access layer, wireless (e.g., WiFi) mesh networks represent a convenient way to provide access when physical cabling is not an option. Customers may seek to be able to implement mesh networking over fabric networks to take advantages of both fabric overlay networking and mesh networking technologies. Since mesh nodes are mobile, this poses an issue with how fabric networks may be implemented.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Locator identification (ID) separation protocol (LISP)-based fabric networks provides for wireless client support. Access points (APs) may not have enough memory and central processing unit (CPU) resources to run as full fabric nodes and may, therefore, be considered as fabric extensions. This means that a fabric AP may not run the LISP fabric control plane protocol but may be configured to send encapsulated/tunneled traffic to a fabric edge (FE) node for the client data plane traffic. For example, the fabric AP may use a virtual extensible local area network (VxLAN) tunnel in an instance of a software-defined access (SDA) fabric. These frames may be processed at a FE node and sent into the fabric overlay. For the FE node to process these tunnel packets, the FE node may require an access tunnel interface to the APs. To configure this, a wireless controller (WLC) may create, for each fabric AP, a specific entry in a LISP control plane server to register the AP location and notify the corresponding FE node. In the case of the SDA fabric, the WLC may leverage a layer 2 (L2) virtual network identification (VNID) entry in the LISP map server (MS)/map resolver (MR) (MS/MR), using the AP radio media access control (MAC) address as an endpoint identifier (EID). This entry may be used to trigger an access tunnel creation on a switch associated with the fabric edge.

However, the above method works as long as the scenario described is "static" where, for example, the AP is not moving or roaming from one AP to another. The entries in, for example, the MS/MR may be added at a time when the AP joins a network (e.g., via an FE) when the AP disconnects from the network. But in a mesh environment, such assumption is not guaranteed in that the "location" of the AP may change.

In a mesh network such as a wireless mesh network, AP roles may include a number of root access points (RAPs), and a number of mesh access points (MAPs) coupled to one of the RAPs. A RAP may include any AP that is connected directly to the wired infrastructure and represent the root of the mesh network. As mentioned, the RAP may be a parent node to a number of MAPs. A MAP may include any wireless mesh node and may be connected to a RAP or to another MAP (parent), using a wireless backhaul. A wireless backhaul may include any wireless communication systems and standards to transport data between the internet and subnetworks and may assist an organization or mobile network to eliminate a need for physical cabling.

Figure 1:
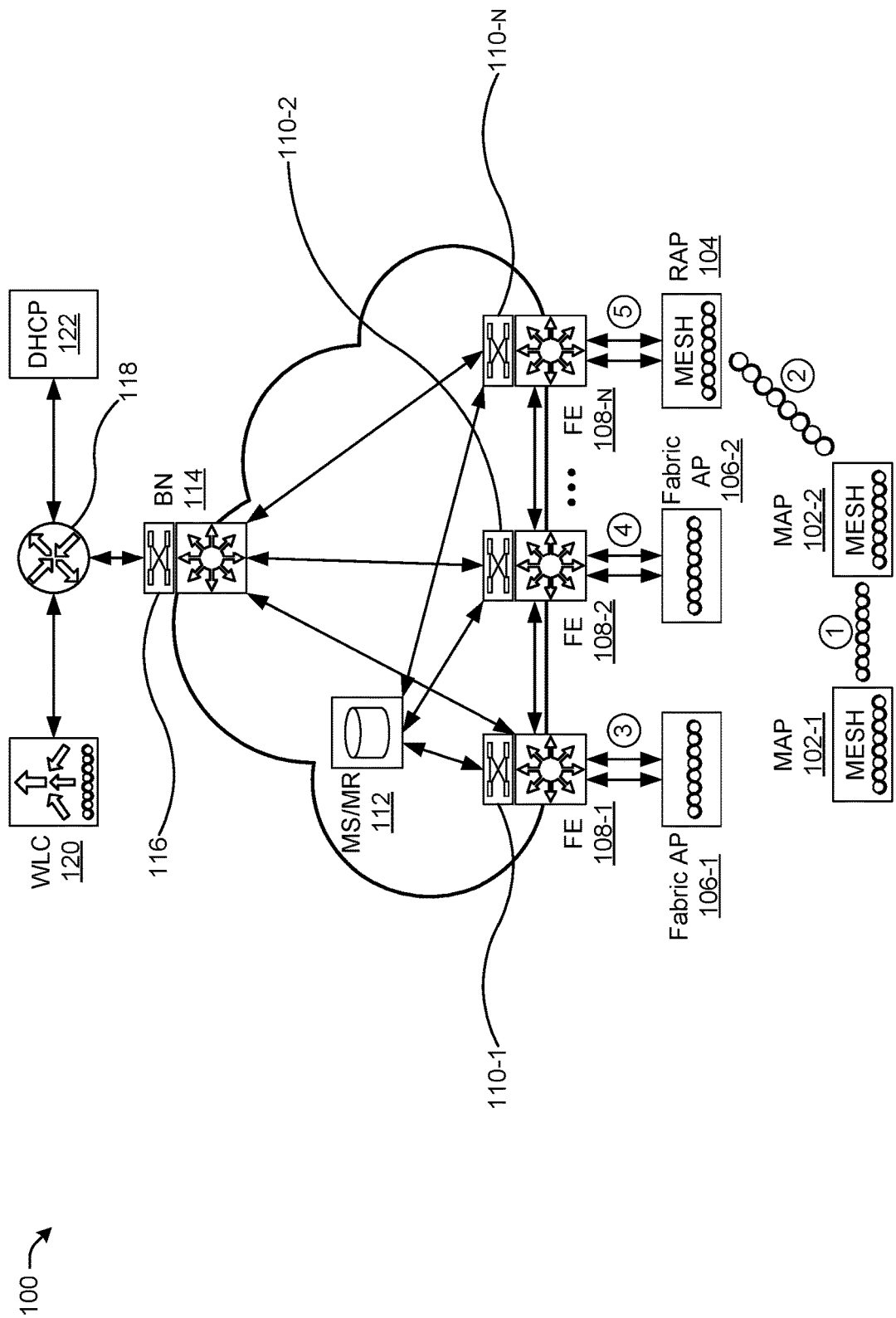
FIG. 1 illustrates a system-architecture diagram of a mesh network topology.
Figure 2:
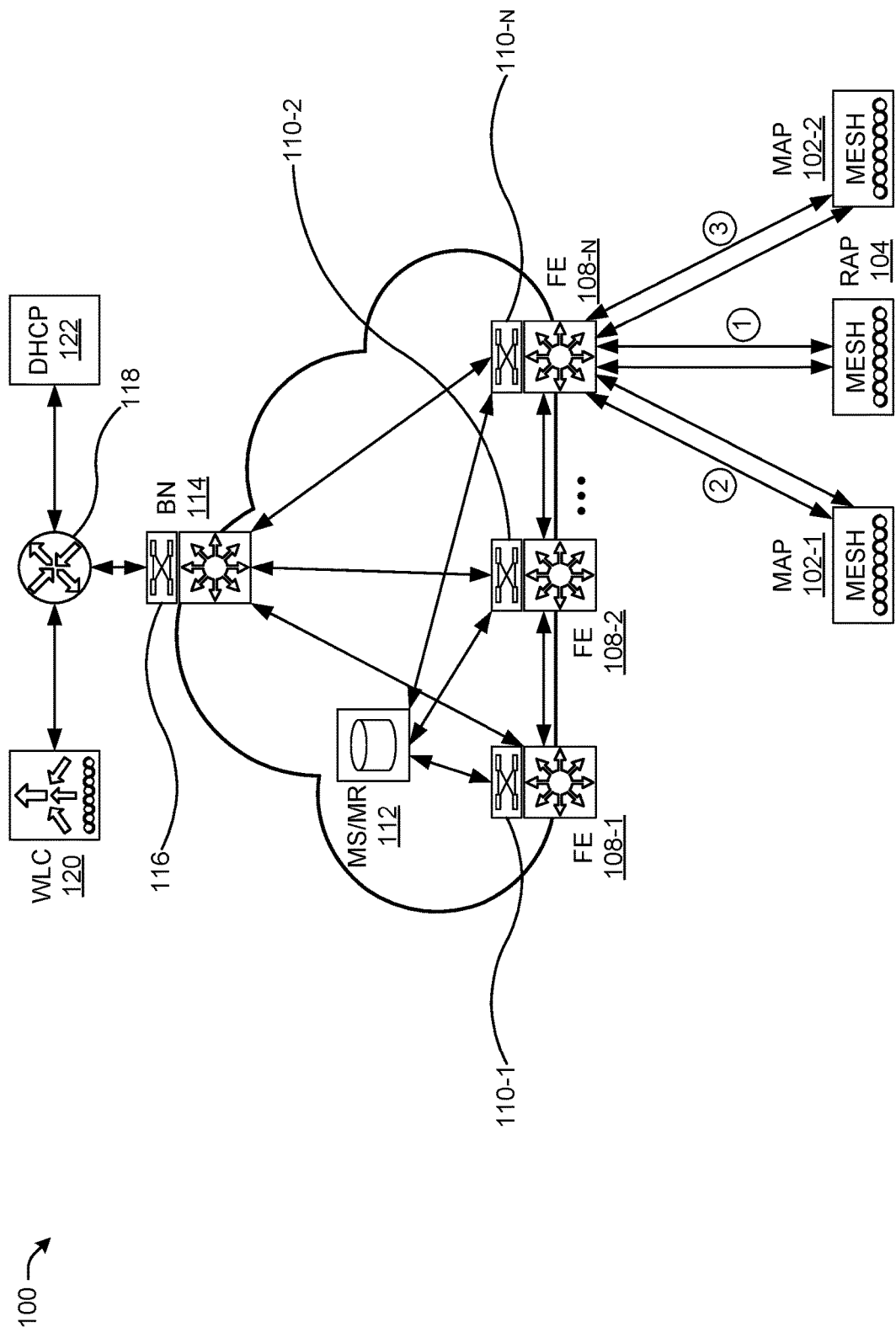
FIG. 2 illustrates a system-architecture diagram of the mesh network topology of FIG. 1 from the point of view of an FE.

In one example, a MAP may have reachability to a WLC through the wireless backhaul. The wireless backhaul may be, by design, dynamic wherein the wireless backhaul depends on radio frequency (RF) conditions. Further, the wireless backhaul may experience configuration changes over time, which means that the path between a MAP and the WLC may change over without having any service disruption. In a mesh fabric network, every MAP may be viewed as a standard fabric AP such that an entry is created for the MAO in a database of the MS/MR and an access tunnel is created on an FE. FIG. 1 illustrates a system-architecture diagram of a network topology 100. In one example, the network topology 100 may be a mesh network topology. FIG. 2 illustrates a system-architecture diagram of the network topology 100 of FIG. 1 from the point of view of an FE 108-1, 108-2, 108-N, where N is any integer greater than or equal to 1 (collectively referred to herein as FE(s) 108 unless specifically addressed otherwise). The network topology 100 may include a WLC 120 communicatively coupled to a dynamic host configuration protocol (DHCP) server 122 via a switch 118. The WLC 120, DHCP server 122 and switch 118 may be coupled to a border node (BN) 114 and, specifically, an edge switch 116 associated with the BN 114. An MS/MR 112 may be included in the network topology 100 to implement part of a distributed LISP mapping database by accepting registration requests from its client egress tunnel routers (ETRs), aggregating the successfully registered EID prefixes of those ETRs, and advertising the aggregated prefixes into the alternative logical topology (ALT) with border gateway protocol (BGP). Further, the MS/MR 112 may connect to the ALT, accept encapsulated Map-Request messages from ingress tunnel routers (ITRs), decapsulate those messages, and forward the messages to the MS responsible for the egress tunnel routers (ETRs) that are authoritative for the requested EIDs. The FEs 108 may include FE switches 110-1, 110-2, 110-N, where N is any integer greater than or equal to 1 (collectively referred to herein as FE switch(s) 110 unless specifically addressed otherwise) that are in communication with the MS/MR 112, the BN 114, and/or other FEs 108.

As depicted in FIG. 1, a number of fabric APs 106-1, 106-2 may be coupled to a first FE 108-1 and a second FE 108-2, for example. The fabric APs 106-1, 106-2 may include any number of wired or wireless APs to which other computing devices may communicate with. Further, a number of RAPs 104 (e.g., mesh RAPs) may be coupled to the network topology 100 via another FE 108-N. A number of MAPs 102-1, 102-2 may be coupled to the mesh RAP 104.

Each of the devices may be communicatively coupled to one another through the use of a number of protocols and through the transmission of data packets including a number of frames. For example, at indicator "1," a first MAP 102-1 may communicate with another MAP such as, for example, MAP 102-2 using adaptive wireless path protocol (AWPP) developed by Cisco Systems, Inc. The MAPs 102-1, 102-2 may communicate among themselves and back to the RAPs 104 using a wireless connections over the 802.11a/n radio backhaul. The MAPs 102-1, 102-2 may use the AWPP to determine the best path through the other mesh AP to a controller such as the WLC 120. Further, in one example of communication at indicator "1," the first MAP 102-1 may communicate with another MAP such as, for example, MAP 102-2 using control and provisioning of wireless access points protocol (CAPWAP) developed by Cisco Systems, Inc. CAPWAP may include an underlying protocol used in wireless local area network (WLAN) architectures and provides the configuration and management of APs and WLANs in addition to encapsulation and forwarding of WLAN client traffic between an AP and WLC 120. Still further, the first MAP 102-1 may communicate with another MAP such as, for example, MAP 102-2 via a VxLAN tunnel. Similar protocols may be used by the MAPs 102-1, 102-2 to communicate with the RAP 104 at indicator "2." The fabric APs and the RAPs 104 may communicate, at indicators "3," "4," and "5," with their respective FEs 108 via VxLAN and CAPWAP.

The manner in which the mesh RAPs 104 and the MAPs 102-1, 102-2 are viewed from the point of view of the FEs 108 is depicted in FIG. 2. From the perspective of the FEs 108, the mesh RAPs 104 and the MAPs 102-1, 102-2 are viewed as all connecting to the FEs 108 directly. Indeed, in one example, VxLAN traffic may be generated by the MAPs 102-1, 102-2 and transported by mesh wireless backhaul to an access tunnel provided by an FE 108. The FE 108, like for every other VxLAN frame received via an access tunnel, may encapsulate in VxLAN to the BN 114 or another FE 108. The MAPs 102-1, 102-2 are seen by the FEs 108 like a fabric AP and are learned by the FE 108 on an access port of the RAP 104.

In instances where a MAP 102-1, 102-2 roams or moves to a new mesh parent that is connected to a different RAP 104 that is, in turn, connected to a different FE 108, the MAP location of that MAP 102-1, 102-2 and all the locations of its mesh sub-tree should be updated so that the data plane tunnels from the MAP 102-1, 102-2 may be updated as well. The new FE 108 may update the LISP-based MS/MR 112 for the MAPs 102-1, 102-2 themselves as it receives traffic from the MAPs 102-1, 102-2. However, the entries created by the WLC 120 for the access tunnels creation will not be updated since the WLC 120 is not aware of the changes in the underlying network fabric.

Figure 3:
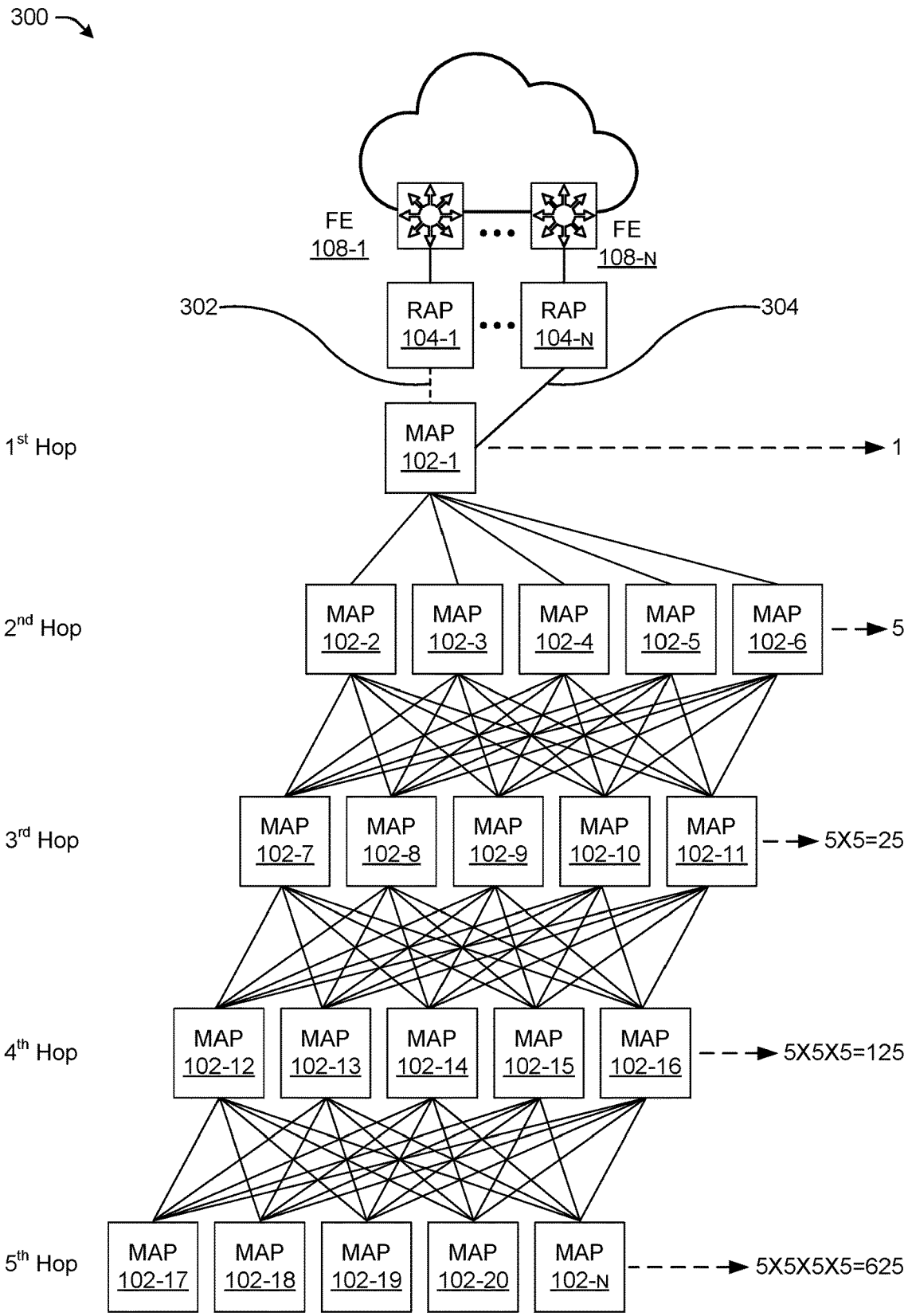
FIG. 3 illustrates a system-architecture diagram of the mesh network topology including a roaming instance.

Each MAP 102-1, 102-2 may have multiple MAP 102-1, 102-2 leaf nodes depending from them where each of the MAP 102-1, 102-2 leaf nodes may have multiple client devices coupled thereto. Therefore, there likely exists a very large number of entries that would need to be updated in the WLC 120 which would, in turn, require an extremely large number of control plane messages being sent throughout the network topology 100. An example of a potential control plane storm triggered by a MAP 102-1, 102-2 moving from a first FE 108 to a second, new FE 108 is depicted in FIG. 3. FIG. 3 illustrates a system-architecture diagram of the network topology 300 (e.g., mesh network topology) including a roaming instance. As depicted in FIG. 3, a number of RAPs 104-1, 104-N, where N is any integer greater than or equal to 1 (collectively referred to herein as RAP(s) 104 unless specifically addressed otherwise) may be coupled to a number of FEs 108. In the example of FIG. 3, a first MAP 102-1 may include a number of MAPs 102-2 through 102-N, where N is any integer greater than or equal to 1 (collectively referred to herein as MAP(s) 102 unless specifically addressed otherwise) within its mesh sub-tree. Although MAP 102-1 includes 20 MAPs 102 within its mesh sub-tree, as designated by "N," any number of MAPs 102 may be included within the mesh sub-tree. The first MAP 102-1 may be a parent AP to the MAPs 102-2 through 102-N and may couple the MAPs 102-2 through 102-N to the network topology 300 via a first RAP 104-1 as indicated by line 302. However, in a roaming instance, first MAP 102-1 may disconnect from the first RAP 104-1 and reconnect to the network topology 300 via a second RAP 104 such as RAP 104-N as indicated by line 304. In one example, the roaming may include any fabric-extension node move that may create traffic interruptions within, for example, a host tracking database (HTDB)-based fabric network.

FIG. 3 depicts a 5-hop mesh tree topology including 5 MAPs 102 per hop. In one example, each of the MAPs 102 may be coupled to 20 client devices. In this example, as the first MAP 102-1 roams, this roaming may impact 781 MAPs since at the first MAP 102-1 at the first hop, 1 node is impacted; at the second hop, 5 nodes are impacted; at the third hop, $5^2$ nodes are impacted; at the fourth hop, $5^3$ nodes are impacted; and at the fifth hop, $5^4$ nodes are impacted. Thus 1+5+25+125+625=781. Considering the 20 client devices per MAP 102, this results in over 15,000 control plane notifications being sent throughout the network topology 300 since 781×20=15,620. This extremely massive amount of control plane messages creates significant data transmission issues throughout the network topology 300.

Overview

In the examples described herein, an efficient and constructive manner of solving the above-described issues relating to instances where access point roaming occurs provides for the introduction of a number of hierarchical relational entries in a fabric control plane database. Through the use of the hierarchical relational entries, the WLC 120 may quickly identify the nodes within the mesh sub-tree and allow for data packets to be transmitted as was performed before the roaming instance.

Examples described herein provide a method of updating map server entries including generating a map server database (DB) at a map server. The map server DB may include a plurality of relational fields for a plurality of entries. The method may further include, based at least in part on a first entry of the plurality of entries being updated including a change to a first network location of the first entry, updating a second network location of a second entry of the plurality of entries that has a relation with the first entry based on the relational fields.

The updating may be performed recursively with respect to the plurality of entries that are updated. The change to the first network location of the first entry may be performed based on a roaming of a wireless mesh access point (MAP) associated with the first network location from a first root access point (RAP) to a second RAP. The method may further include transmitting a MAP notification message to a fabric edge associated with the second network location. The first network location and the second network location may include routing locators (RLOCs). The plurality of entries may define a plurality of wireless MAPs communicatively coupled to one of a plurality of RAPs, a plurality of RAPs communicatively coupled to one of a plurality of fabric edges (FEs), a plurality of wireless client devices communicatively coupled to one of the plurality of the wireless MAPs, and combinations thereof.

The change to the first network location of the first entry may include a change of the first network location of a first wireless MAP of a plurality of wireless MAPs communicatively coupled from a first RAP to a second RAP. The method may further include generating the plurality of relational fields based at least in part on a wireless node detecting an access point. The method may further include generating, for the plurality of entries, a list of a plurality of wireless MAPs effected by the change to the first network location, and updating a plurality of network locations of the plurality of wireless MAPs based on the relational fields and the list of the plurality of wireless MAPs. The list of the plurality of wireless MAPs effected by the change to the first network location includes a client MAP server entry pointing to its respective MAP server entry, a first MAP server entry pointing to at least a second MAP server entry, and combinations thereof.

Examples described herein also provide a computing device including a processor and a non-transitory computer-readable media storing instructions that, when executed by the processor, causes the processor to perform operations. The operations may include generating a map server database (DB) at a map server. The map server DB may include a plurality of relational fields for a plurality of entries. The operations may further include, based at least in part on a first entry of the plurality of entries being updated including a change to a first network location of the first entry, updating a second network location of a second entry of the plurality of entries that has a relation with the first entry based on the relational fields.

The change to the first network location of the first entry is performed based on a roaming of a wireless mesh access point (MAP) associated with the first network location from a first root access point (RAP) to a second RAP. The operations may further include transmitting a MAP notification message to a fabric edge associated with the second network location. The plurality of entries may define a plurality of wireless MAPs communicatively coupled to one of a plurality of RAPs, a plurality of RAPs communicatively coupled to one of a plurality of fabric edges (FEs), a plurality of wireless client devices communicatively coupled to one of the plurality of the wireless MAPs, and combinations thereof. The change to the first network location of the first entry may include a change of the first network location of a first wireless MAP of a plurality of wireless MAPs communicatively coupled from a first root AP to a second root AP. The operations may further include generating, for the plurality of entries, a list of a plurality of wireless MAPs effected by the change to the first network location, and updating a plurality of network locations of the plurality of wireless MAPs based on the relational fields and the list of the plurality of wireless MAPs. The list of the plurality of wireless MAPs effected by the change to the first network location may include a client MAP server entry pointing to its respective MAP server entry, a first MAP server entry pointing to at least a second MAP server entry, and combinations thereof.

Examples described herein also provide a non-transitory computer-readable medium storing instructions that, when executed, causes a processor to perform operations. The operations may include generating a map server database (DB) at a map server. The map server DB may include a plurality of relational fields for a plurality of entries. The operations may further include, based at least in part on a first entry of the plurality of entries being updated including a change to a first network location of the first entry, updating a second network location of a second entry of the plurality of entries that has a relation with the first entry based on the relational fields.

The plurality of entries may define a plurality of wireless mesh access points (MAPs) communicatively coupled to one of a plurality of root access points (RAPs), a plurality of RAPs communicatively coupled to one of a plurality of fabric edges (FEs), a plurality of wireless client devices communicatively coupled to one of the plurality of the wireless MAPs, and combinations thereof. The change to the first network location of the first entry may include a change of the first network location of a first wireless MAP of a plurality of wireless MAPs communicatively coupled from a first RAP to a second RAP. The operations further may further include generating, for the plurality of entries, a list of a plurality of wireless MAPs effected by the change to the first network location, and updating a plurality of network locations of the plurality of wireless MAPs based on the relational fields and the list of the plurality of wireless MAPs. The list of the plurality of wireless MAPs effected by the change to the first network location may include a client MAP server entry pointing to its respective MAP server entry, a first MAP server entry pointing to at least a second MAP server entry, and combinations thereof.

As used in the present specification and in the appended claims, the terms "roam," "roaming," or similar language is meant to be understood broadly as any instance within a network where a device within the network becomes disconnected from a presently associated network element (e.g., an access point, a switch, etc.) and becomes connected to a different network element (e.g., an access point, a switch, etc.) in the network.

Further, even though a LISP-based fabric is described herein in connection with the various examples, issues and solutions apply to any fabric topology that utilizes a HTDB. In one example, the present systems and methods may affect fabric networks where fabric extension nodes (e.g., non-full fabric edge nodes) are utilized, and where the FEs are not able to detect certain mobility events of these extension nodes. For example, the application-centric infrastructure (ACI) in the datacenter space includes L2 extensions with a control plane using OpFlex; a southbound protocol in an SDN that is designed to facilitate communications between an SDN controller and the infrastructure including, for example, switches and routers.

Additionally, the techniques described in this disclosure may be performed as a method and/or by a system having non-transitory computer-readable media storing computer-executable instructions that, when executed by one or more processors, performs the techniques described above.

Example Embodiments

Figure 4:
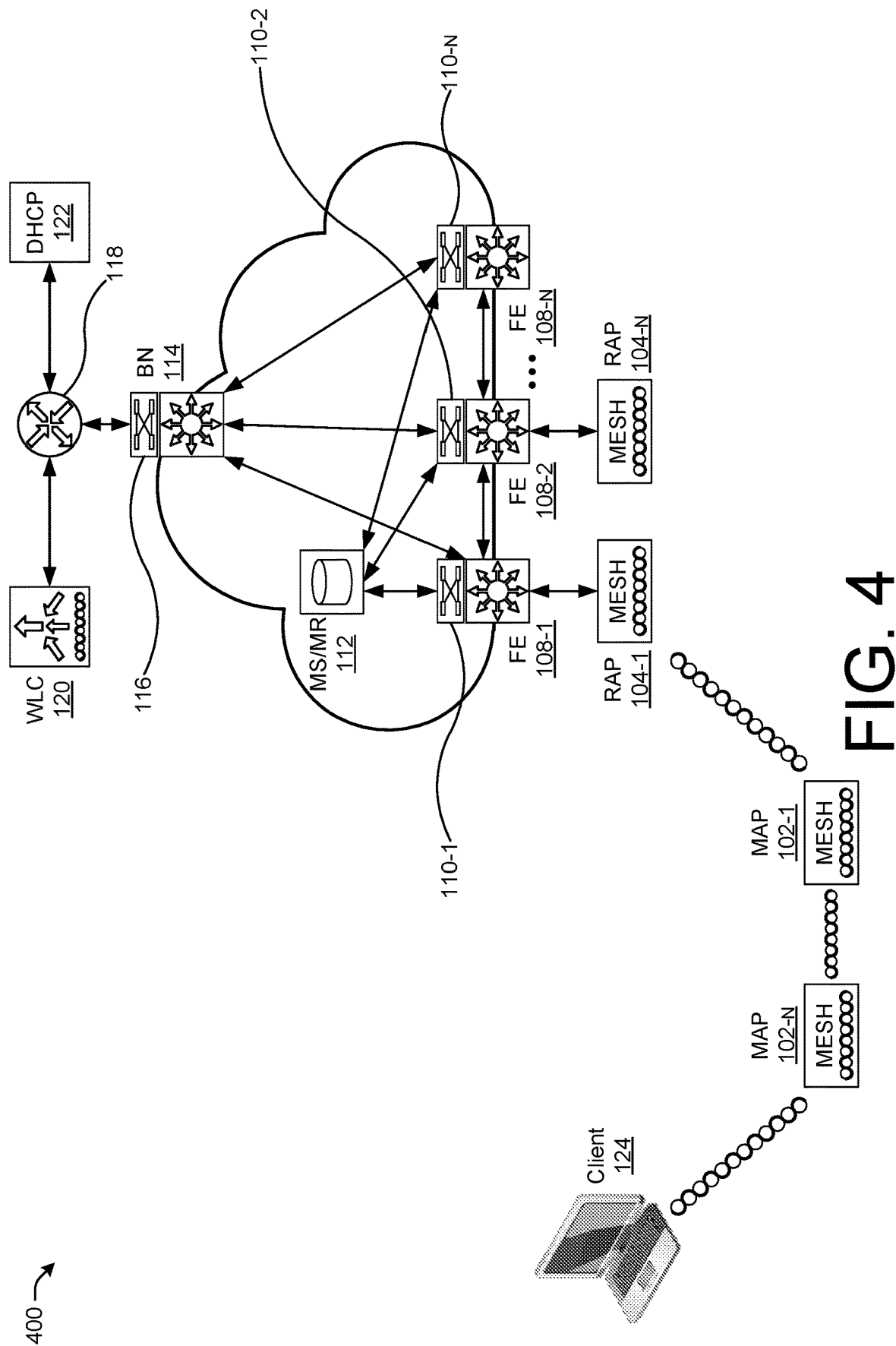
FIG. 4 illustrates a system-architecture diagram of a mesh network topology, according to an example of the principles described herein.
Figure 5:
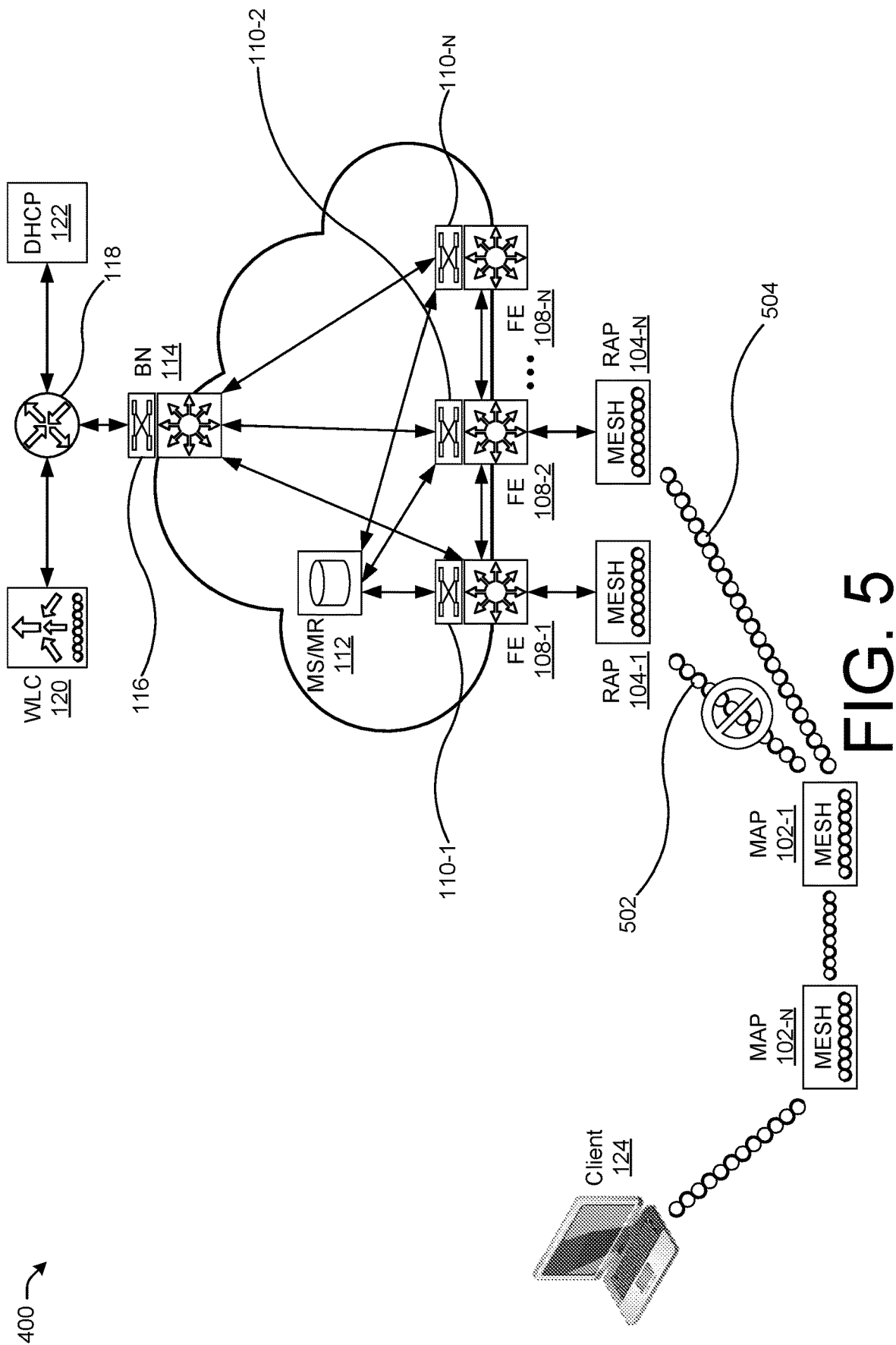
FIG. 5 illustrates a system-architecture diagram of the mesh network topology of FIG. 4 once a roaming instance takes place, according to an example of the principles described herein.

As to the example embodiments of the present systems and methods, FIG. 4 illustrates a system-architecture diagram of a network topology 400 (e.g., mesh network topology), according to an example of the principles described herein. FIG. 5 illustrates a system-architecture diagram of the network topology 400 of FIG. 4 once a roaming instance takes place, according to an example of the principles described herein. The network topology 400 of FIGS. 4 and 5 may include a WLC 120. The WLC 120 may include any device configured to track and update connectivity and mobility of a client device 124 in a network such as the network topology 400. AP image and configuration management, client session management, and mobility services are all provided by the WLC 120. Further, the WLC 120 provides additional fabric integration services, such as registering wireless client MAC addresses in the host tracking database of, for example, the MS/MR 112 during wireless client join events and delivering FE 108 routing locator (RLOC)-association updates to the HTDB during client roaming events. In one example, the WLC 120 may utilize CAPWAP tunneling for control plain traffic.

The WLC 120 may be coupled to a DHCP server 122 via a switch 118. The DHCP server 122 may assign and manage internet protocol (IP) addresses from specified address pools within the device to DHCP clients such as the client device 124, the MAPs 102, the RAPs 104, the FEs 108, the BN 114, and other devices within the network topology 400. Further, the DHCP server 122 may be configured to assign additional parameters such as the IP address of a domain name system (DNS) server and a default device.

The switch 118 may be coupled to an edge switch 116 associated with the BN 114. The BN 114 allows traffic to egress and ingress the network topology 400. The BN 114 may also function as a connection point between an SD-access fabric site and outside networks. The BN 114 may also provide EID subnet advertisement including the routing protocol BGP (Border Gateway Protocol) being used to advertise the coarse-aggregate endpoint prefix space outside of the network fabric and vice versa. Further, the BN 114 functions as a fabric site exit point where the BN 114 acts as the gateway of last resort and uses the functionality of the LISP proxy tunnel router (PxTR) and registers known routers with the MS/MR 112 that serves as the control plan node. Still further, the BN 114 serves as a network virtualization extension to external devices where the BN 114 provides the network virtualization. Further, in one example, the BN 114 may participate in policy mapping including storing scalable group tag (SGT) information from within the fabric so that it can be properly maintained when exiting the fabric. Still further, the BN 114 participates in VxLAN encapsulation/de-encapsulation including encapsulating packets received from outside the fabric and destined for an endpoint inside the fabric in fabric VXLAN and de-encapsulates packets originating from within the fabric and destined for outside the fabric. The MS/MR 112 and the BN 114 may be coupled to a number of the FE switches 110. The FE switches 110 may allow the FEs 108 to communicate with the MS/MR 112, the BN 114, and other FEs 108.

As depicted in FIG. 4, a number of RAPs 104 may each be coupled to one of the FEs 108. In one example, the RAPs 104 may be coupled to the FEs 108 via a wired connection. In one example, the RAPs 104 may be coupled to the FEs 108 via a wireless connection. A number of MAPs 102 may be coupled to the RAPs 104, and in the example of FIG. 4, MAP 102-1 may be directly coupled to RAP 104-1, and MAP 102-N may, in turn, be coupled to MAP 102-1. Although only two MAPs 102-1, 102-N are depicted in FIG. 4, any number of MAPs 102 may be included in the network topology 400. Further, the client device 124 may be coupled to one of the MAPs such as MAP 102-N. Although one client device 124 is depicted in FIG. 4, any number of client devices 124 may be coupled to the MAPs 102 of the network topology 400. In one example, while the RAPs 104 may have wired connections to the controller (e.g., the MS/MR 112), the MAPs 102 may have wireless connections to the controller. The MAPs 102 may communicate among themselves and back to the RAPs 104 using wireless connections over the 802.11a/n radio backhaul. Further, the MAPs 102 may use the adaptive wireless path protocol (AWPP) developed by Cisco Systems, Inc. to determine the best path through the other mesh access points to the controller.

Turning now to FIG. 5, as may occur, MAP 102-1 may roam from RAP 104-1 to RAP 104-N as indicated by arrows 502 and 504 and the indication at arrow 502 that the connection between MAP 102-1 and the first RAP 104-1 no longer exists. By roaming, one or more of a number of entries within a map server database (DB) of the MS/MR 112 may not properly update in instances where the present systems and methods are not employed. For example, Table 1 is an illustration of a number of entries in the map server DB of the MS/MR 112 before the roam instance depicted in FIG. 5.

TABLE 1

Database table before a roam event

| Entry No. | EID | ETR | RLOC | VNID |
|---|---|---|---|---|
| 1 | RAP1_MAC | FE-1 | FE-1 | INFRA |
| 2 | RAP1_IP | FE-1 | FE-1 | L3 |
| 3 | RAP1_RADIOMAC | WLC | FE-1 | INFRA |
| 4 | RAP2_MAC | FE-2 | FE-2 | INFRA |
| 5 | RAP2_IP | FE-2 | FE-2 | L3 |
| 6 | RAP2_RADIOMAC | WLC | FE-2 | INFRA |
| 7 | MAP1_MAC | FE-1 | FE-1 | INFRA |
| 8 | MAP1_IP | FE-1 | FE-1 | L3 |
| 9 | MAP1_RADIOMAC | WLC | FE-1 | INFRA |
| 10 | MAP2_MAC | FE-1 | FE-1 | INFRA |
| 11 | MAP2_IP | FE-1 | FE-1 | L3 |
| 12 | MAP2_RADIOMAC | WLC | FE-1 | INFRA |
| 13 | CLIENT_MAC | FE-1 / WLC | FE-1 | CLIENT |
| 14 | CLIENT_IP | FE-1 | FE-1 | L3 |

In one example, the plurality of entries within the Tables described herein (e.g., Tables 1 through 5) may correspond to the network topologies 100, 300, 400 and the devices within those networks. Thus, the Tables described herein (e.g., Tables 1 through 5) define a plurality of wireless MAPs communicatively coupled to one of a plurality of RAPs, a plurality of RAPs communicatively coupled to one of a plurality of FEs, a plurality of wireless client devices communicatively coupled to one of the plurality of the wireless MAPs, and combinations thereof.

As indicated in Table 1, each entry may include an endpoint identifier (EID) that is an IPv4 or IPv6 address used in the source and destination address fields of the first and most inner LISP header of a packet. RAP 104-1, RAP 104-N, MAP 102-1, MAP 102-N, and the client device 124 all have a number of EIDs associated with them in the entries of Table 1. For example, the EIDs of RAP 104-1 and RAP 104-N may include a MAC address (e.g., RAP1_MAC and RAP2_MAC, respectively), an IP address (e.g., RAP1_IP and RAP2_IP, respectively), and a MAC address of the radio(s) (e.g., 2.4 GHz and 5 GHz radios) of the RAP 104-1 and RAP 104-N (e.g., RAP1_RADIOMAC and RAP2_RADIOMAC, respectively). Similarly, the EIDs of MAP 102-1 and MAP 102-N include a MAC address (e.g., MAP1_MAC and MAP2_MAC, respectively), an IP address (e.g., MAP1_IP and mAP2_IP, respectively), and a MAC address of the radio(s) (e.g., 2.4 GHz and 5 GHz radios) of the MAP 102-1 and MAP 102-N (e.g., MAP1_RADIOMAC and MAP2_RADIOMAC, respectively). The entries associated with the client device 124 may include a MAC address (e.g., CLIENT_MAC) and an IP address (e.g., CLIENT_IP).

Each entry in Table 1 may also include an egress tunnel router (ETR) indication that indicates a device that is the tunnel endpoint. The ETR accepts an IP packet where the destination address in the outer IP header is one of its own routing locators (RLOCs). A RLOC is an IPv4 or IPv6 address of the ETR and is the output of an EID-to-RLOC mapping lookup. ETR functionality does not have to be limited to a router device, and a server host may be the endpoint of a LISP tunnel as well. The ETR for RAP 104-1 may include FE 108-1 as being associated with the RAP1_MAC and RAP1_IP and the WLC 120 as being associated with the RAP1_RADIOMAC. Similarly, the ETR for RAP 104-N may include FE 108-2 as being associated with the RAP2_MAC and RAP2_IP and the WLC 120 as being associated with the RAP2_RADIOMAC. The ETR for MAP 102-1 may include FE 108-1 as being associated with the MAP1_MAC and MAP1_IP and the WLC 120 as being associated with the MAP1_RADIOMAC. Similarly, the ETR for MAP 102-N may include FE 108-1 as being associated with the MAP2_MAC and MAP2_IP and the WLC 120 as being associated with the MAP2_RADIOMAC. This is because both MAP 102-1 and 102-N are within the sub-tree behind RAP 104-1, which, in turn, uses the FE 108-1 as its ETR. Further, the ETR for the client device 124 may include the FE 108-1 and the WLC 120 as being associated with the CLIENT_MAC and the FE 108-1 as being associated with the CLIENT_IP.

The RLOCs for the RAPs 104-1, 104-N, the MAPs 102-1, 102-N, and the client device 124 may be used by network elements (e.g., routers, switches, etc.) for looking up the mapping between the EIDs and the RLOCs. This process may be invisible to Internet end-hosts. The mappings may be stored in a distributed database such as the map server DB of the MS/MR 112, which responds to the lookup queries. The RLOC for RAP 104-1 may include FE 108-1 as being associated with the RAP1_MAC, RAP1_IP, and the RAP1_RADIOMAC. Similarly, the RLOC for RAP 104-N may include FE 108-2 as being associated with the RAP2_MAC, RAP2_IP, and the RAP2_RADIOMAC. The RLOC for MAP 102-1 may include FE 108-1 as being associated with the MAP1_MAC, MAP1_IP, and the MAP1_RADIOMAC. Similarly, the RLOC for MAP 102-N may include FE 108-1 as being associated with the MAP2_MAC, MAP2_IP, and the MAP2_RADIOMAC. This is because both MAP 102-1 and 102-N are within the sub-tree behind RAP 104-1, which, in turn, uses the FE 108-1 as its RLOC. Further, the RLOC for the client device 124 may include the FE 108-1 as being associated with the CLIENT_MAC and the CLIENT_IP.

Table 1 may further include a VNID for the RAPs 104-1, 104-N, the MAPs 102-1, 102-N, and the client device 124. As mentioned herein, the WLC 120 may leverage an L2 VNID entry in the map server DB of the LISP-based MS/MR 112, using the AP radio MAC as endpoint identifier. The VNID entries may be used to trigger the access tunnel creation on the FEs 108. VxLAN utilizes an 8-byte VxLAN header that consists of a 24-bit VNID and a few reserved bits. The VxLAN header together with the original Ethernet frame may be included in a UDP payload. The 24-bit VNID may be used to identify L2 segments and to maintain L2 isolation between the segments. With all 24 bits in VNID, VxLAN may support 16 million LAN segments. In one example, the WLC 120 may notify the MS/MR 112 with the EID and RLOC associated with L2-VNID via a registration message to the WLC 120. The registration message(s) associated with the VNID, in one example, may include the VNID registration that includes the EID and the RLOC specifying the switch network identifier (e.g., IP address or other identifier) and associated network address (e.g., IPv4 and IPv6 address(es)). In the examples described herein, the VNID may be an identification associated with the virtual routing and forwarding (VRF) and/or bridge domain (BD) ("INFRA") VNID in which VxLAN frames may be encapsulated. Further, the designation of L3 as the VNID indicates that since every MAP 102 has L3 reachability with the WLC 120.

Table 1 depicts the state of the network topology 400 before the roam event occurs and without the systems and methods described herein. Table 2, however, depicts the state of the network topology 400 after the roam event occurs and without the systems and methods described herein. The differences between Table 1 and Table 2 are indicative of the network topology 400 in FIG. 4 before the roaming event and the network topology 400 in FIG. 5 after the roaming event.

TABLE 2

Database table after a roam event with indications of non-updated wireless client and MAP radio MAC entries

| Entry No. | EID | ETR | RLOC | VNID |
|---|---|---|---|---|
| 1 | RAP1_MAC | FE-1 | FE-1 | INFRA |
| 2 | RAP1_IP | FE-1 | FE-1 | L3 |
| 3 | RAP1_RADIOMAC | WLC | FE-1 | INFRA |
| 4 | RAP2_MAC | FE-2 | FE-2 | INFRA |
| 5 | RAP2_IP | FE-2 | FE-2 | L3 |
| 6 | RAP2_RADIOMAC | WLC | FE-2 | INFRA |
| 7 | MAP1_MAC | FE-2 | FE-2 | INFRA |
| 8 | MAP1_IP | FE-2 | FE-2 | L3 |
| 9 | MAP1_RADIOMAC | WLC | FE-1 | INFRA |

TABLE 2-continued

Database table after a roam event with indications
of non-updated wireless client and MAP radio MAC entries

| Entry No. | EID | ETR | RLOC | VNID |
|---|---|---|---|---|
| 10 | MAP2_MAC | FE-2 | FE-2 | INFRA |
| 11 | MAP2_IP | FE-2 | FE-2 | L3 |
| 12 | MAP2_RADIOMAC | WLC | FE-1 | INFRA |
| 13 | CLIENT_MAC | FE-1/WLC | FE-1 | CLIENT |
| 14 | CLIENT_IP | FE-1 | FE-1 | L3 |

Table 2: Database table after a roam event with indications of non-updated wireless client and MAP radio MAC entries As depicted in Table 2, some entries indicate instances where the fields were updated (e.g., the ETR and RLOC fields for entry numbers 7, 8, 10, and 11), and other entries indicate fields that are not updated (e.g., the ETR fields for entry numbers 13 and 14, and the RLOC fields for entry numbers 9, 12, 13, and 14). As may be evident between Table 1 and Table 2, although the ETR and RLOC entries for the first MAP 102-1 and the second MAP 102-N have been updated from the first FE 108-1 to the second FE 108-2, the entries for the client device 124 including the CLIENT_MAC (e.g., entry number 13) and CLIENT_IP (e.g., entry number 14) and the MAP1_RADIOMAC (e.g., entry number 9) and MAP2_RADIOMAC (e.g., entry number 12) entries for the first MAP 102-1 and the second MAP 102-N have not been updated. This same information would be reflected in the map server DB of the MS/MR 112 and/or in a storage device of the WLC 120. Because these entries are not updated, traffic from the client device 124, the first MAP 102-1, and the second MAP 102-N is interrupted. Further, load balancing between FEs 108 within the network topology 400 may be altered where, in the example of FIGS. 4 and 5, the first FE 108-1 no longer receives and processes communications from the client device 124, the first MAP 102-1, and the second MAP 102-N, and the second FE 108-2 or other FEs 108 may be required to perform that processing. Still further, the control plane of the network fabric may be required to transmit an extremely large number of update messages to individual devices which would increase the computing load of the control plane.

In order to ensure that the ETR and RLOC entries for the first MAP 102-1, the second MAP 102-N, and the client device 124 are updated, the present systems and methods utilize a number of hierarchical relational entries in a fabric control plane database such as the map server DB of the MS/MR 112, in a storage device of the WLC 120 or other control plane device. These hierarchical relational entries are depicted in Tables 3, 4, and 5. In one example, the plurality of hierarchal relational fields may be generated based at least in part on or in response to a wireless node such as, for example, a MAP 102 detecting an access point such as, for example, a RAP 104. This detection of an access point may occur in a first instance where the MAP 102 and any sub-tree devices first couple to the network topology 400. Further, in one example, this detection of an access point may occur in a second instance where the roaming event depicted in FIG. 5 occurs.

Table 3 depicts the database table in a state of the network topology 400 before the roam event occurs and with the application of the systems and methods described herein. Table 4 depicts the database table in a state of the network topology 400 after the roam event occurs and with the application of the systems and methods described herein and without updates being applied. Table 5 depicts the database table in a state of the network topology 400 after the roam event occurs and with the application of the systems and methods described herein and with updates being applied.

TABLE 3

Database table before a roam event with relation entries

| Entry No. | EID | ETR | Relation | RLOC | VNID |
|---|---|---|---|---|---|
| 1 | RAP1_MAC | FE-1 | | FE-1 | INFRA |
| 2 | RAP1_IP | FE-1 | | FE-1 | L3 |
| 3 | RAP1_RADIOMAC | WLC | | FE-1 | INFRA |
| 4 | RAP2_MAC | FE-2 | | FE-2 | INFRA |
| 5 | RAP2_IP | FE-2 | | FE-2 | L3 |
| 6 | RAP2_RADIOMAC | WLC | | FE-2 | INFRA |
| 7 | MAP1_MAC | FE-1 | | FE-1 | INFRA |
| 8 | MAP1_IP | FE-1 | | FE-1 | L3 |
| 9 | MAP1_RADIOMAC | WLC | MAP1_MAC | FE-1 | INFRA |
| 10 | MAP2_MAC | FE-1 | | FE-1 | INFRA |
| 11 | MAP2_IP | FE-1 | | FE-1 | L3 |
| 12 | MAP2_RADIOMAC | WLC | MAP2_MAC | FE-1 | INFRA |
| 13 | CLIENT_MAC | FE-1 / WLC | MAP2_MAC | FE-1 | CLIENT |
| 14 | CLIENT_IP | FE-1 | MAP2_MAC | FE-1 | L3 |

As indicated in Table 3, the database table, which may be stored in any form and utilized by the map server DB of the MS/MR 112, a storage device of the WLC 120, or other control plane device, may further include a number of hierarchical relational entries. These hierarchical relational entries allow the MS/MR 112, the WLC 120, or other control plane device to identify instances when a roaming event occurs, update the entries within the database table, and preventing any interruptions in traffic within the network topology 400 and reducing or eliminating effects of load balancing among the FEs 108. In one example, the MS/MR 112 or other control plane device may generate the map server DB including a plurality of the relational fields for a plurality of entries. Based at least in part on a first entry of the plurality of entries being updated including a change to a first network location (e.g., the RLOC) of the first entry, the MS/MR 112 or other control plane device may update a second network location of a second entry of the plurality of entries that has a relation with the first entry based on the relational fields. For example, as indicated in Table 3, the MAP1_RADIOMAC entry of the first MAP 102-1 (e.g., entry number 9) may include a hierarchal relational entry of MAP1_MAC which would indicate to the MS/MR 112 or other control plane device that the MAP1_RADIOMAC entry should be updated in a manner similar or identical to the MAP1_MAC of the first MAP 102-1. In other words, whatever entry for the RLOC of MAP1_MAC (e.g., entry number 7) should be copied to the RLOC of the MAP1_RADIOMAC entry (e.g., entry number 9).

Similarly, in one example, as indicated in Table 3, the MAP2_RADIOMAC entry of the second MAP 102-N (e.g., entry number 9) may include a hierarchal relational entry of MAP2_MAC which would indicate to the MS/MR 112 or other control plane device that the MAP2_RADIOMAC entry should be updated in a manner similar or identical to the MAP2_MAC of the second MAP 102-N. In other words, whatever entry for the RLOC of MAP2_MAC (e.g., entry number 10) should be copied to the RLOC of the MAP2_RADIOMAC entry (e.g., entry number 12).

Similarly, in one example, as indicated in Table 3, the CLIENT_MAC entry of the client device 124 (e.g., entry number 13) and the CLIENT_IP entry of the client device 124 (e.g., entry number 14) may each include a hierarchal relational entry of MAP2_MAC which would indicate to the MS/MR 112 or other control plane device that the MAP2_RADIOMAC entry should be updated in a manner similar or identical to the CLIENT_MAC entry and the CLIENT_IP entry of the client device 125. In other words, whatever entry for the RLOC of MAP2_MAC (e.g., entry number 10) should be copied to the RLOC of the CLIENT_MAC entry (e.g., entry number 13) and the CLIENT_IP entry (e.g., entry number 14) of the client device 125.

With these hierarchal relational entries included in the database table, a roaming event may occur as indicated in FIG. 5 wherein the connection between the first RAP 104-1 and the first MAP 102-1 is lost and the first MAP 102-1 roams to the second RAP 104-N to form a connection between the second RAP 104-N and the first MAP 102-1.

TABLE 4

Database table after a roam event with relation entries

| Entry No. | EID | ETR | Relation | RLOC | VNID |
|---|---|---|---|---|---|
| 1 | RAP1_MAC | FE-1 | | FE-1 | INFRA |
| 2 | RAP1_IP | FE-1 | | FE-1 | L3 |
| 3 | RAP1_RADIOMAC | WLC | | FE-1 | INFRA |
| 4 | RAP2_MAC | FE-2 | | FE-2 | INFRA |
| 5 | RAP2_IP | FE-2 | | FE-2 | L3 |
| 6 | RAP2_RADIOMAC | WLC | | FE-2 | INFRA |
| 7 | MAP1_MAC | FE-2 | | FE-2 | INFRA |
| 8 | MAP1_IP | FE-2 | | FE-2 | L3 |
| 9 | MAP1_RADIOMAC | WLC | MAP1_MAC | FE-1 | INFRA |
| 10 | MAP2_MAC | FE-2 | | FE-2 | INFRA |
| 11 | MAP2_IP | FE-2 | | FE-2 | L3 |
| 12 | MAP2_RADIOMAC | WLC | MAP2_MAC | FE-1 | INFRA |
| 13 | CLIENT_MAC | FE-1/WLC | MAP2_MAC | FE-1 | CLIENT |
| 14 | CLIENT_IP | FE-1 | MAP2_MAC | FE-1 | L3 |

Table 4: Database table after a roam event with relation entries

As depicted in Table 4, the ETR and RLOC entries for the MAP1_MAC, MAP1_IP, MAP2_MAC, and MAP2_IP are updated from the first FE 108-1 (e.g., FE-1) to the second FE 108-2 (e.g., FE-2) associated with second RAP 104-N. However, as indicated in Table 4, the entries for MAP1_RADIOMAC entry (e.g., entry number 9), MAP2_RADIOMAC entry (e.g., entry number 12), CLIENT_MAC entry (e.g., entry number 13), and CLIENT_IP entry (e.g., entry number 14) are not updated. The state indicated in Table 4 is essentially the same state as depicted in Table 2 wherein, although the ETR and RLOC entries for the first MAP 102-1 and the second MAP 102-N have been updated from the first FE 108-1 to the second FE 108-2, the entries for the client device 124 including the CLIENT_MAC and CLIENT_IP and the entries for the first MAP 102-1 and the second MAP 102-N including MAP1_RADIOMAC and MAP2_RADIOMAC have not been updated. This same information would be reflected in the map server DB of the MS/MR 112 and/or in a storage device of the WLC 120. Because these entries are not updated, traffic from the client device 124, the first MAP 102-1, and the second MAP 102-N is interrupted. Further, load balancing between FEs 108 within the network topology 400 may be altered where, in the example of FIGS. 4 and 5, the first FE 108-1 no longer receives and processes communications from the client device 124, the first MAP 102-1, and the second MAP 102-N, and the second FE 108-2 or other FEs 108 may be required to perform that processing. Therefore, the systems and methods described herein provide for the correction of ETR and RLOC entries within the database table.

TABLE 5

Database table after a roam event with relation entries and relational updates

| Entry No. | EID | ETR | Relation | RLOC | VNID |
|---|---|---|---|---|---|
| 1 | RAP1_MAC | FE-1 | | FE-1 | INFRA |
| 2 | RAP1_IP | FE-1 | | FE-1 | L3 |
| 3 | RAP1_RADIOMAC | WLC | | FE-1 | INFRA |
| 4 | RAP2_MAC | FE-2 | | FE-2 | INFRA |
| 5 | RAP2_IP | FE-2 | | FE-2 | L3 |
| 6 | RAP2_RADIOMAC | WLC | | FE-2 | INFRA |
| 7 | MAP1_MAC | FE-2 | | FE-2 | INFRA |
| 8 | MAP1_IP | FE-2 | | FE-2 | L3 |
| 9 | MAP1_RADIOMAC | WLC | MAP1_MAC | FE-2 | INFRA |

TABLE 5-continued

Database table after a roam event with relation
entries and relational updates

| Entry No. | EID | ETR | Relation | RLOC | VNID |
|---|---|---|---|---|---|
| 10 | MAP2_MAC | FE-2 | | FE-2 | INFRA |
| 11 | MAP2_IP | FE-2 | | FE-2 | L3 |
| 12 | MAP2_RADIOMAC | WLC | MAP2_MAC | FE-2 | INFRA |
| 13 | CLIENT_MAC | FE-2/ WLC | MAP2_MAC | FE-2 | CLIENT |
| 14 | CLIENT_IP | FE-2 | MAP2_MAC | FE-2 | L3 |

Table 5: Database table after a roam event with relation entries and relational updates As depicted, the dark grey shaded entries in Table 5 indicate fields (e.g., the relational fields and RLOC fields for entry numbers 9, 12, 13, and 14, and the ETR fields for entry numbers 13 and 14) that were not updated in Table 4 but are now updated in Table 5. Specifically, because at entry number 9 the hierarchical relational entry indicates that the MAP1_RADIOMAC should utilize the RLOC of MAP1_MAC (e.g., FE-2 (the second FE 108-2)), entry number 9 may be updated to reflect "FE-2" as the RLOC. Similarly, the RLOC of MAP2_RADIOMAC, CLIENT_MAC, and CLIENT_IP may be updated to reflect the RLOC of MAP2_MAC as designated in their respective hierarchical relational entries at entry numbers 12, 13, and 14 to the second FE 10-2 (e.g., FE-2) since the RLOC of MAP2_MAC is also the second FE 10-2 (e.g., FE-2). If the network topology 400 of FIGS. 4 and 5 included more MAPs 102, then those MAPs 102 may be updated in a similar manner as described above.

The updating of the entries using the hierarchical relational entries may be performed recursively with respect to the plurality of entries that are updated. For example, the process may be implemented in instances where a MAP 102 roams from a first RAP 104 to a second RAP 104. The change to the first network location of the first entry may be performed based on a roaming of a wireless mesh access point (AP) (e.g., MAP 102) associated with the first network location from a first root AP (e.g., RAP 104) to a second root AP (e.g., RAP 104).

In one example, a MAP notification message may be transmitted to a number of FEs 108 associated with the second network location in order to ensure consistency across the fabric. In one example, an owner of a specific entry may update a local database based on the notification received to ensure that the state across the entities in the system is consistent. The MAP notification message may notify of the switch from a first FE 108 to a second FE 108 with the MS/MR 112, the WLC 120, or other control plane device to permit binding of the client device 124, the MAPs 102, the RAPs 104 and other devices within the fabric to the new FE 108. In one example, the MS/MR 112, the WLC 120, or other control plane device may generate an L2 entry for the database table for an associated VNID. In one example, the MAP notification message may include the EID, the ETR, and/or the RLOC.

In one example, the present systems and methods may include a variation wherein entries within the MS/MR 112 may recursively point to other entries within the MS/MR 112. For example, the entries in the MS/MR 112 associated with the client device 124 may point to an entry in the MS/MR 112 associated with its access point (e.g., a MAP 102). Further, in the case of a MAP 102, a MAP 102 may point to other entries in the MS/MR 112 associated with its access point (e.g., another MAP 102 or a RAP 104). This variation in the present systems and methods may have at least two advantages. First, this various may not be specific to mesh fabrics thus allowing for the present systems and methods to be employed in a greater number of network topologies. A second advantage may include roaming or mobility becomes trivial as a single entry in the MS/MR 112 will need to be updated. Even though the RLOC resolution in this variation may create a recursive overhead that depends on the depth of the mesh tree, RLOC caching may be used to amortize that cost on frequently looked up entries.

Mesh RLOC Propagation

To avoid a need of sending specific messages to each AP (e.g., MAPs 102, RAPs 104, and FEs 108) to tell the fabric tunnel destination (e.g., referred to as an access tunnel) must be updated. In one example, the specific messages may include a type-length-value encoding scheme used for optional informational elements in a certain protocol. A TLV-encoded data stream may include code related to the record type, the record value's length, and the value itself. In one example, a number of mesh beacons may be enhanced to propagate information to all the nodes in the cascade. A new field may be added to the mesh beacons to provide RLOC info throughout the mesh fabric. The MAPs 102 may broadcast the mesh beacons. If the RLOC information of a parent node within the mesh fabric, the fabric tunnel may be updated to change the endpoint destination, and the RLOC may be updated in local beacons.

Figure 6:
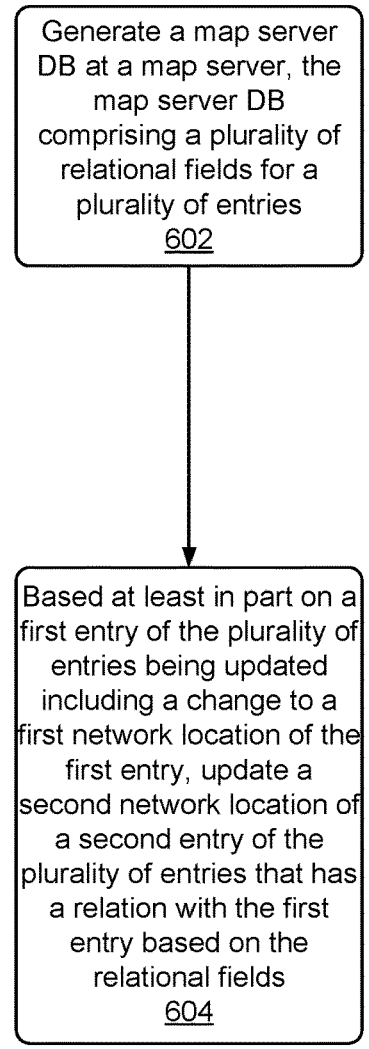
FIG. 6 illustrates a flow diagram of an example method of updating map server entries, according to an example of the principles described herein.

FIG. 6 illustrates a flow diagram of an example method 600 of updating map server entries, according to an example of the principles described herein. The method 600 may include generating, at 602, a map server DB at a map server such as, for example, the MS/MR 112. In one example, the map server DB may include a plurality of relational fields for a plurality of entries within the map server database. At 604, based at least in part on a first entry of the plurality of entries being updated including a change to a first network location of the first entry, a second network location of a second entry of the plurality of entries that has a relation with the first entry may be updated based on the relational fields. By so doing, the MAPs 102 within the network topology 100, 300, 400 may not experience traffic interruptions when a MAP 102 roams.

Figure 7:
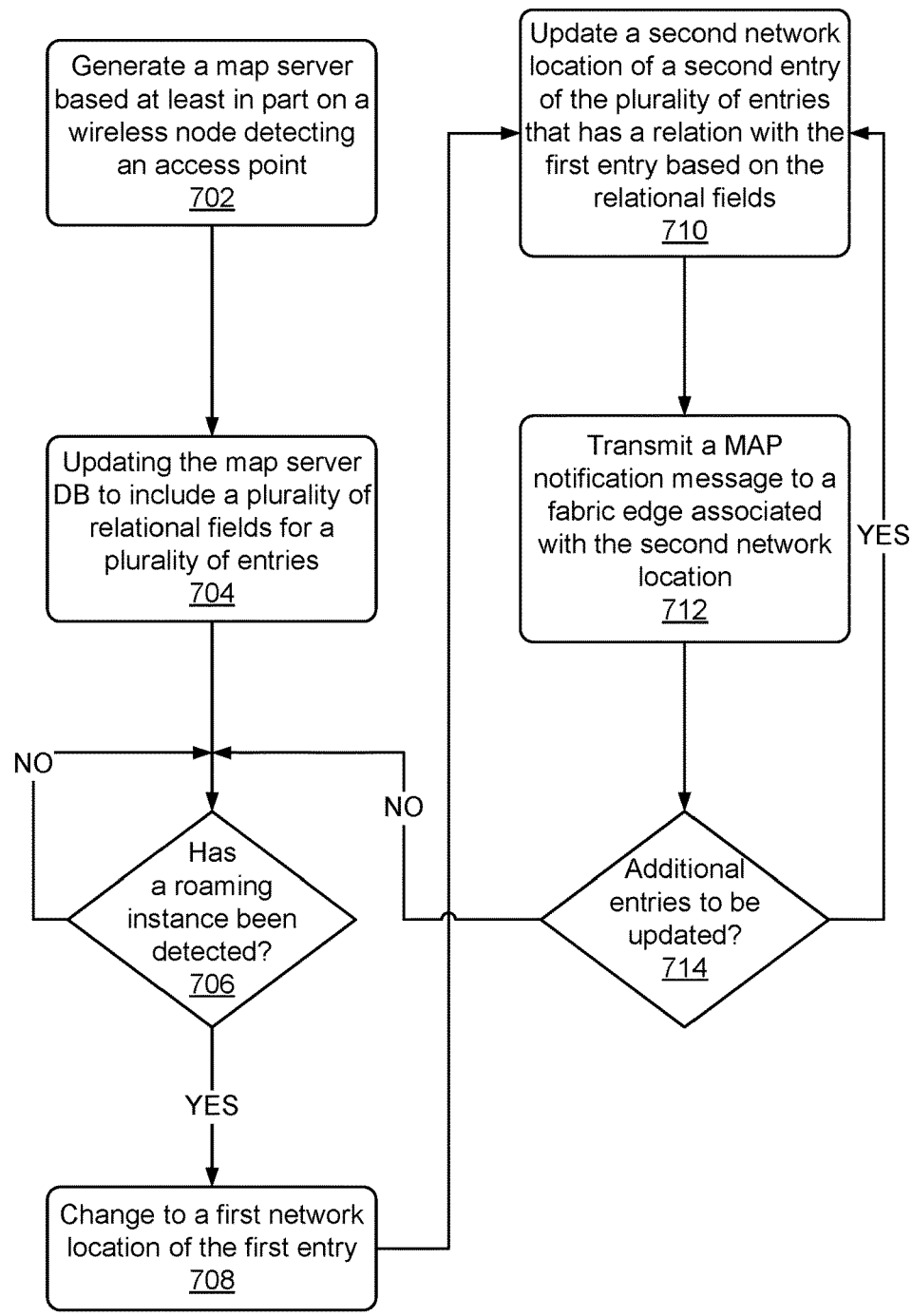
FIG. 7 illustrates a flow diagram of an example method of updating map server entries, according to an example of the principles described herein.

FIG. 7 illustrates a flow diagram of an example method 700 of updating map server entries, according to an example of the principles described herein. The method 700 of FIG. 7 may include, at 702, generating a plurality of relational fields within a map server DB at a map server such as, for example, the MS/MR 112. The generation of the plurality of relational fields may be based at least in part on a wireless node such as, for example, a MAP 102 detecting an access point such as, for example, a RAP 104. In one example, the generation of the plurality of relational fields may take place when a MAP 102, for the first time, connects to a network topology 100, 300, 400 via a RAP 104 such as when the network fabric is built. In one example, the generation of the plurality of relational fields may take place when a MAP 102 roams from a first RAP 104 to a second RAP 104. Roaming may be the result of loss in connectivity between a first MAP 102 and a first RAP 104 and the reconnection to the network topology 100, 300, 400 via a second access point such as a second RAP 104.

At 704, the map server DB at, for example, the MS/MR 112 may be updated to include a plurality of relational fields for a plurality of entries within the map server DB. As described herein, the relational fields may include any hierarchal relational information associated with a second entry that points to a first entry that has been modified or updated so that the second entry may also be updated in a similar manner to maintain hierarchal relationships between a device (e.g., MAPs 102 or client devices 124) and access points (e.g., RAPs 104) within the network topology 100, 300, 400 and to ensure that all devices within the hierarchy are linked to the same access point.

A determination may be made at 706 as to whether a roaming instance has been detected. If no roaming instance has been detected (706, determination NO), then the method 700 may loop to after 704 to allow for the determination of 706 to be made any number of iterations and at any frequency. In this manner, the detection of a roaming instance provides for that ability to recursively update the map server DB.

If, instead, a roaming instance has been detected (706, determination YES), then the method 700 may proceed to 708 where a first network location of the first entry is changed or updated. The first entry may include, for example, entry numbers 7, 8, 10, and 11 of Tables 3, 4, and 5 that were initially updated in Table 4.

At 710 a second network location of a second entry of the plurality of entries that has a relation with the first entry may be updated based on the relational fields. The second entry may include, for example, entry numbers 9, 12, 13, and 14 of Tables 3, 4, and 5 that were updated in Table 5 based on the updates to entry numbers 7, 8, 10, and 11 at Table 4. At 712, a MAP notification message may be transmitted to at least one FE 108 associated with the second network location in order to ensure that the FE 108 is aware of the relationship between the first entry and the second entry and to allow for this information to be transmitted to the MS/MR 112, the WLC 120, and/or other control plane devices.

At 714, it may be determined whether additional entries in the map server DB are to be updated. This would allow the entirety of the map server DB to be updated including any entry defining any device within the network topology 100, 300, 400. If it is determined that additional entries in the map server DB are to be updated (714, determination YES), then the method 700 may loop back to 710 to update any additional entries. If it is determined that additional entries in the map server DB are not to be updated (714, determination NO), then the method 700 may loop back to 706 where it may be determined whether a subsequent roaming instance has been detected. In this manner, the detection of a roaming instance and the determination at 714 provides for that ability to recursively update the map server DB as a roaming instance occurs through use of the hierarchical relational entries of the map server DB stored and maintained by the MS/MR 112, the WLC 120, or other control plane device.

Figure 8:
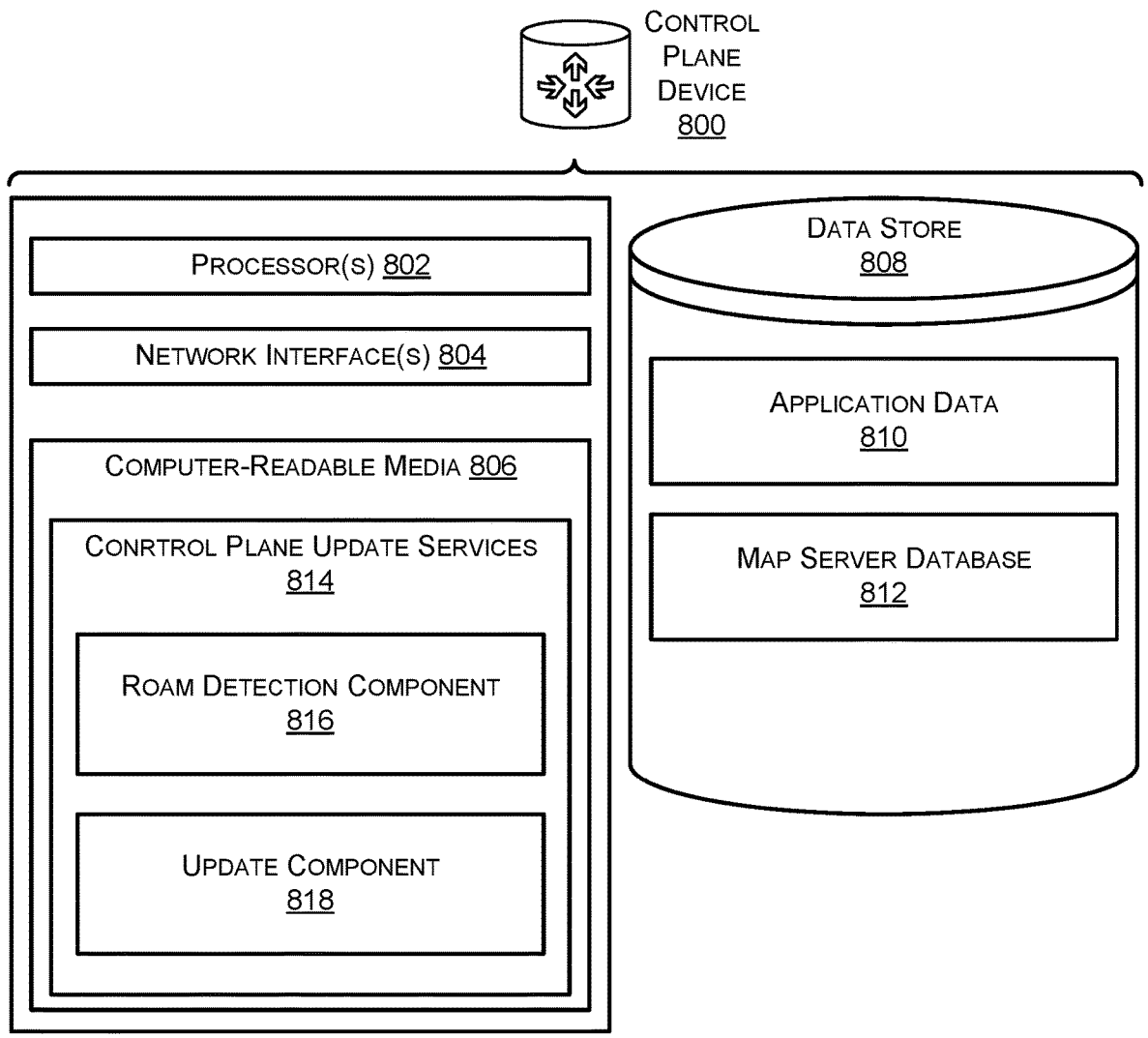
FIG. 8 is a component diagram of example components of a control plane device, according to an example of the principles described herein.

FIG. 8 is a component diagram of example components of a control plane device, according to an example of the principles described herein. The control plane device 800 may include the MS/MR 112, the WLC 120, or other control plane device within a network fabric. As illustrated in FIG. 8, the control plane device 800 may include one or more hardware processor(s) 802 configured to execute one or more stored instructions. The processor(s) 802 may comprise one or more cores. Further, the control plane device 800 may include one or more network interfaces 804 configured to provide communications between the control plane device 800 and other devices, such as devices associated with the system architectures of FIGS. 1 through 5 including the WLC 120, the DHCP server 122, the BN 114, the MS/MR 112, the FEs 108, the RAPs 104, the MAPs 102, the client device 124, and/or other systems or devices associated with the network topology 100, 300, 400 and/or remote from the network topology 100, 300, 400. The network interfaces 804 may include devices configured to couple to personal area networks (PANs), wired and wireless local area networks (LANs), wired and wireless wide area networks (WANs), and so forth. For example, the network interfaces 804 may include devices compatible with the WLC 120, the DHCP server 122, the BN 114, the MS/MR 112, the FEs 108, the RAPs 104, the MAPs 102, the client device 124 and/or other systems or devices associated with the control plane device 800.

The control plane device 800 may also include computer-readable media 806 that stores various executable components (e.g., software-based components, firmware-based components, etc.). In one example, the computer-readable media 806 may include, for example, working memory, random access memory (RAM), read only memory (ROM), and other forms of persistent, non-persistent, volatile, non-volatile, and other types of data storage. In addition to various components discussed herein, the computer-readable media 806 may further store components to implement functionality described herein. While not illustrated, the computer-readable media 806 may store one or more operating systems utilized to control the operation of the one or more devices that comprise the control plane device 800. According to one example, the operating system comprises the LINUX operating system. According to another example, the operating system(s) comprise the WINDOWS SERVER operating system from MICROSOFT Corporation of Redmond, Washington. According to further examples, the operating system(s) may comprise the UNIX operating system or one of its variants. It may be appreciated that other operating systems may also be utilized.

Additionally, the control plane device 800 may include a data store 808 which may comprise one, or multiple, repositories or other storage locations for persistently storing and managing collections of data such as databases, simple files, binary, and/or any other data. The data store 808 may include one or more storage locations that may be managed by one or more database management systems. The data store 808 may store, for example, application data 810 defining computer-executable code utilized by the processor 802 to execute the applications and components of the computer-readable media 806. Further, the data store 808 may include a map server database 812 including data and entries relating to computing devices within the network topology 100, 300, 400. The map server database 812 may include, for example, EIDs, ETRs, hierarchal relational entries, RLOCs, VNIDs, and other data associated with a number of the devices within the network topology 100, 300, 400 and other data that may be used by the applications and components of the computer-readable media 806. The hierarchal relational entries define a hierarchal relationship between a parent node (e.g., RAPs 104 and MAPs 102) and a child node (e.g., MAPs 102 and client devices 124) that defines how the parent node and child node are to be coupled to the network topology 100, 300, 400 before and after a roaming instance.

The computer-readable media 806 may store portions, or components, of control plane update services 814. For instance, the control plane update services 814 of the computer-readable media 806 may include a roam detection component 816 to, when executed by the processor(s) 802, detect instances where a MAP 102 roams from a first RAP 104 to a second RAP 104. The roam detection component 816 may detect an instance when a MAP 102 no longer is in communication with a RAP 104, an FE 108, the MS/MR 112, the WLC 120, the DHCP server 122 or other device within the network topology 100, 300, 400. The roam detection component 816 may include all or a portion of the executable code associated with the control plane device 800 and may be executed to bring about the functionality of the control plane device 800 as described herein.

The computer-readable media 806 may also include an update component 818. The update component 818, when executed by the processor(s) 802, may update the map server DB of the MS/MR 112 after a roaming instance is detected in order to ensure that the roaming devices may continue to communicate within the network topology 100, 300, 400 according to the techniques described herein.

Figure 9:
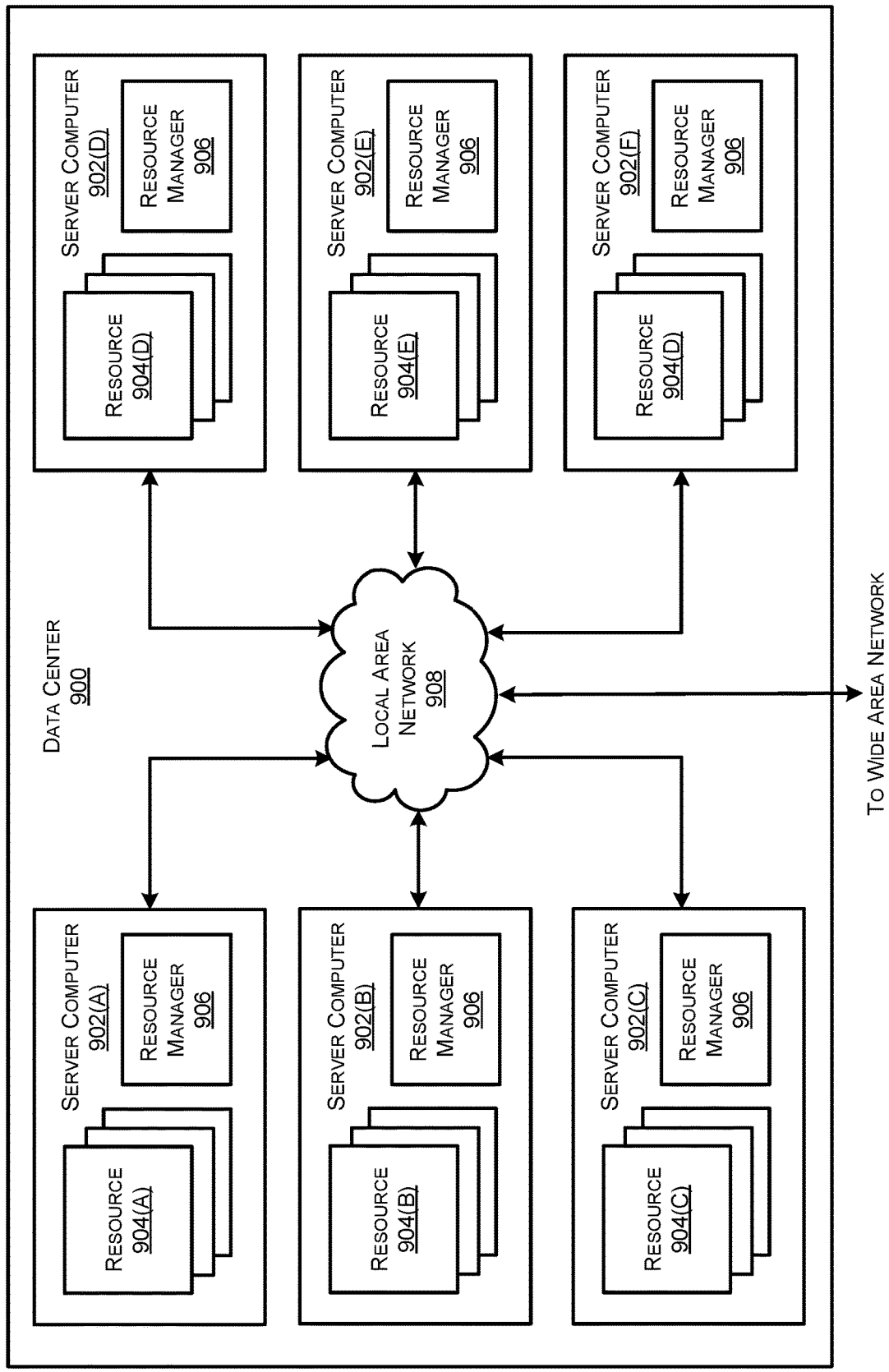
FIG. 9 illustrates a computing system diagram illustrating a configuration for a data center that may be utilized to implement aspects of the technologies disclosed herein.

FIG. 9 illustrates a computing system diagram illustrating a configuration for a data center 900 that may be utilized to implement aspects of the technologies disclosed herein. The example data center 900 shown in FIG. 9 includes several server computers 902A-902F (which might be referred to herein singularly as "a server computer 902" or in the plural as "the server computers 902) for providing computing resources. In some examples, the resources and/or server computers 902 may include, or correspond to, any type of networked device described herein. Although described as servers, the server computers 902 may comprise any type of networked device, such as servers, switches, routers, hubs, bridges, gateways, modems, repeaters, access points, etc.

The server computers 902 may be standard tower, rack-mount, or blade server computers configured appropriately for providing computing resources. In some examples, the server computers 902 may provide computing resources 904 including data processing resources such as VM instances or hardware computing systems, database clusters, computing clusters, storage clusters, data storage resources, database resources, networking resources, virtual private networks (VPNs), and others. Some of the server computers 902 may also be configured to execute a resource manager 906 capable of instantiating and/or managing the computing resources. In the case of VM instances, for example, the resource manager 906 may be a hypervisor or another type of program configured to enable the execution of multiple VM instances on a single server computer 902. Server computers 902 in the data center 900 may also be configured to provide network services and other types of services.

In the example data center 900 shown in FIG. 9, an appropriate LAN 908 is also utilized to interconnect the server computers 902A-902F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 900, between each of the server computers 902A-902F in each data center 900, and, potentially, between computing resources in each of the server computers 902. It may be appreciated that the configuration of the data center 900 described with reference to FIG. 9 is merely illustrative and that other implementations may be utilized.

In some examples, the server computers 902 and or the computing resources 904 may each execute/host one or more tenant containers and/or virtual machines to perform techniques described herein.

In some instances, the data center 900 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 904 provided by the cloud computing network may include various types of computing resources, such as data processing resources like tenant containers and VM instances, data storage resources, networking resources, data communication resources, network services, VPN instances, and the like.

Each type of computing resource 904 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 904 not mentioned specifically herein.

The computing resources 904 provided by a cloud computing network may be enabled in one example by one or more data centers 900 (which might be referred to herein singularly as "a data center 900" or in the plural as "the data centers 900). The data centers 900 are facilities utilized to house and operate computer systems and associated components. The data centers 900 typically include redundant and backup power, communications, cooling, and security systems. The data centers 900 may also be located in geographically disparate locations. One illustrative example for a data center 900 that may be utilized to implement the technologies disclosed herein is described herein with regard to, for example, FIGS. 1 through 8.

Figure 10:
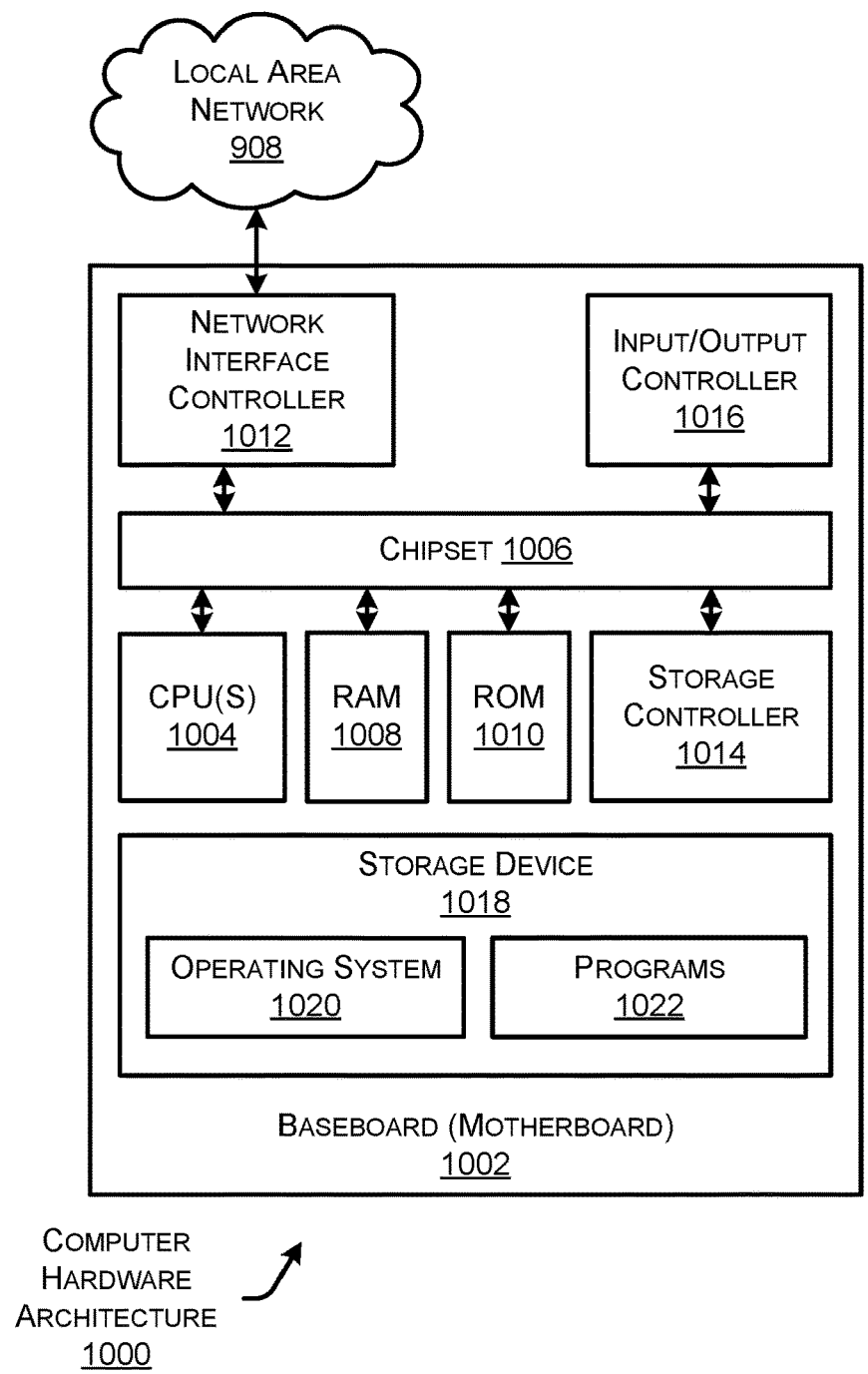
FIG. 10 illustrates a computer architecture diagram showing an example computer hardware architecture for implementing a computing device that may be utilized to implement aspects of the various technologies presented herein.

FIG. 10 illustrates a computer architecture diagram showing an example computer hardware architecture 1000 for implementing a computing device that may be utilized to implement aspects of the various technologies presented herein. The computer hardware architecture 1000 shown in FIG. 10 illustrates the WLC 120, the DHCP server 122, the BN 114, the MS/MR 112, the FEs 108, the RAPs 104, the MAPs 102, the client device 124, and/or other systems or devices associated with the network topology 100, 300, 400 and/or remote from the network topology 100, 300, 400, a workstation, a desktop computer, a laptop, a tablet, a network appliance, an e-reader, a smartphone, or other computing device, and may be utilized to execute any of the software components described herein. The computer 1000 may, in some examples, correspond to a network device (e.g., WLC 120, the DHCP server 122, the BN 114, the MS/MR 112, the FEs 108, the RAPs 104, the MAPs 102, and/or the client device 124 (and associated devices) described herein, and may comprise networked devices such as servers, switches, routers, hubs, bridges, gateways, modems, repeaters, access points, etc.

The computer 1000 includes a baseboard 1002, or "motherboard," which is a printed circuit board to which a multitude of components or devices may be connected by way of a system bus or other electrical communication paths. In one illustrative configuration, one or more central processing units (CPUs) 1004 operate in conjunction with a chipset 1006. The CPUs 1004 may be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 may provide an interface to a RAM 1008, used as the main memory in the computer 1000. The chipset 1006 may further provide an interface to a computer-readable storage medium such as a read-only memory (ROM) 1010 or non-volatile RAM (NVRAM) for storing basic routines that help to startup the computer 1000 and to transfer information between the various components and devices. The ROM 1010 or NVRAM may also store other software components necessary for the operation of the computer 1000 in accordance with the configurations described herein.

The computer 1000 may operate in a networked environment using logical connections to remote computing devices and computer systems through a network, such as the WLC 120, the DHCP server 122, the BN 114, the MS/MR 112, the FEs 108, the RAPs 104, the MAPs 102, the client device 124, among other devices. The chipset 1006 may include functionality for providing network connectivity through a Network Interface Controller (NIC) 1012, such as a gigabit Ethernet adapter. The NIC 1012 is capable of connecting the computer 1000 to other computing devices within the network topology 100, 300, 400 and external to the network topology 100, 300, 400. It may be appreciated that multiple NICs 1012 may be present in the computer 1000, connecting the computer to other types of networks and remote computer systems. In some examples, the NIC 1012 may be configured to perform at least some of the techniques described herein, such as packet redirects and/or other techniques described herein.

The computer 1000 may be connected to a storage device 1018 that provides non-volatile storage for the computer. The storage device 1018 may store an operating system 1020, programs 1022 (e.g., any computer-readable and/or computer-executable code described herein), and data, which have been described in greater detail herein. The storage device 1018 may be connected to the computer 1000 through a storage controller 1014 connected to the chipset 1006. The storage device 1018 may consist of one or more physical storage units. The storage controller 1014 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 1000 may store data on the storage device 1018 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 1018 is characterized as primary or secondary storage, and the like.

For example, the computer 1000 may store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the storage device 1018 by detecting the physical states or characteristics of one or more particular locations within the physical storage units.

In addition to the storage device 1018 described above, the computer 1000 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 1000. In some examples, the operations performed by the WLC 120, the DHCP server 122, the BN 114, the MS/MR 112, the FEs 108, the RAPs 104, the MAPs 102, the client device 124, and or any components included therein, may be supported by one or more devices similar to computer 1000. Stated otherwise, some or all of the operations performed by the WLC 120, the DHCP server 122, the BN 114, the MS/MR 112, the FEs 108, the RAPs 104, the MAPs 102, the client device 124, and or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 1018 may store an operating system 1020 utilized to control the operation of the computer 1000. According to one example, the operating system 1020 comprises the LINUX operating system. According to another example, the operating system comprises the WINDOWS® SERVER operating system from MICROSOFT Corporation of Redmond, Washington. According to further examples, the operating system may comprise the UNIX operating system or one of its variants. It may be appreciated that other operating systems may also be utilized. The storage device 1018 may store other system or application programs and data utilized by the computer 1000.

In one example, the storage device 1018 or other computer-readable storage media is encoded with computer-executable instructions which, when loaded into the computer 1000, transform the computer from a general-purpose computing system into a special-purpose computer capable of implementing the examples described herein. These computer-executable instructions transform the computer 1000 by specifying how the CPUs 1004 transition between states, as described above. According to one example, the computer 1000 has access to computer-readable storage media storing computer-executable instructions which, when executed by the computer 1000, perform the various processes described above with regard to FIGS. 1 through 8. The computer 1000 may also include computer-readable storage media having instructions stored thereupon for performing any of the other computer-implemented operations described herein.

The computer 1000 may also include one or more input/output controllers 1016 for receiving and processing input from a number of input devices, such as a keyboard, a mouse, a touchpad, a touch screen, an electronic stylus, or other type of input device. Similarly, an input/output controller 1016 may provide output to a display, such as a computer monitor, a flat-panel display, a digital projector, a printer, or other type of output device. It will be appreciated that the computer 1000 might not include all of the components shown in FIG. 10, may include other components that are not explicitly shown in FIG. 10, or might utilize an architecture completely different than that shown in FIG. 10.

As described herein, the computer 1000 may comprise one or more of the WLC 120, the DHCP server 122, the BN 114, the MS/MR 112, the FEs 108, the RAPs 104, the MAPs 102, the client device 124, and/or other systems or devices associated with the network topology 100, 300, 400 and/or remote from the network topology 100, 300, 400. The computer 1000 may include one or more hardware processor(s) such as the CPUs 1004 configured to execute one or more stored instructions. The CPUs 1004 may comprise one or more cores. Further, the computer 1000 may include one or more network interfaces configured to provide communications between the computer 1000 and other devices, such as the communications described herein as being performed by the WLC 120, the DHCP server 122, the BN 114, the MS/MR 112, the FEs 108, the RAPs 104, the MAPs 102, the client device 124, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1022 may comprise any type of programs or processes to perform the techniques described in this disclosure for the WLC 120, the DHCP server 122, the BN 114, the MS/MR 112, the FEs 108, the RAPs 104, the MAPs 102, the client device 124 as described herein. The programs 1022 may enable the devices described herein to perform various operations.

CONCLUSION

The examples described herein provide systems and methods for recursive control plane updates for WiFi mesh support in a network fabric. With the above-described systems and methods, traffic interruption upon a fabric-extension node move (MAP roaming, in this case) for a Host Tracking Database (HTDB)-based network fabric may be reduced or eliminated. Further, the potential for an untenable amount of control plane updates is reduced or eliminated via the use of the hierarchal relational entries to update the map server database 812.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method of updating map server entries, comprising:
generating a map server database (DB) at a map server, the map server DB comprising relational fields for entries associated with access points;
determining a relational field indicating an identifier of a first entry, the relational field being associated with a second entry;
determining a network location change associated with a first network location of the first entry and to a second network location;
based at least in part on the network location change associated with the first network location of the first entry, updating a beacon to include an indication of the second network location such that the second network location is propagated to the access points; and
based at least in part on the relational field and the network location change associated with the first network location of the first entry, updating a third network location of the second entry to indicate the second network location.

2. The method of claim 1, wherein the updating is performed recursively with respect to the entries that are updated.

3. The method of claim 1, wherein the network location change associated with the first network location of the first entry is performed based on a roaming of a wireless mesh access point (MAP) associated with the first network location from a first root access point (RAP) to a second RAP.

4. The method of claim 1, further comprising transmitting a MAP notification message to a fabric edge associated with the third network location.

5. The method of claim 1, wherein the first network location, the second network location, and the third network location comprise routing locators (RLOCs).

6. The method of claim 1, wherein the entries define wireless MAPs communicatively coupled to one of RAPs, the RAPs being communicatively coupled to one of fabric edges (FEs), wireless client devices communicatively coupled to one of the wireless MAPs, and combinations thereof.

7. The method of claim 1, wherein the change to the first network location of the first entry comprises a change of the first network location of a first wireless MAP communicatively coupled from a first RAP to a second RAP.

8. The method of claim 1, further comprising generating the relational fields based at least in part on a wireless node detecting an access point.

9. The method of claim 1, further comprising:
generating, for the entries, a list of wireless MAPs effected by the change to the first network location; and updating network locations of the wireless MAPs based on the relational fields and the list of wireless MAPs.

10. The method of claim 9, wherein the list of wireless MAPs effected by the change to the first network location includes a client MAP server entry pointing to its respective MAP server entry, a first MAP server entry pointing to at least a second MAP server entry, and combinations thereof.

11. A computing device comprising:
a processor; and
a non-transitory computer-readable media storing instructions that, when executed by the processor, causes the processor to perform operations comprising:
generating a map server database (DB) at a map server, the map server DB comprising relational fields for entries associated with access points;
determining a relational field indicating an identifier of a first entry, the relational field being associated with a second entry;
determining a network location change associated with a first network location of the first entry and to a second network location;
based at least in part on the network location change associated with the first network location of the first entry, updating a beacon to include an indication of the second network location such that the second network location is propagated to the access points; and
based at least in part on the relational field and the network location change associated with the first network location of the first entry, updating a third network location of the second entry to indicate the second network location.

12. The computing device of claim 11, wherein the network location change associated with the first network location of the first entry is performed based on a roaming of a wireless mesh access point (MAP) associated with the first network location from a first root access point (RAP) to a second RAP.

13. The computing device of claim 11, the operations further comprising transmitting a MAP notification message to a fabric edge associated with the third network location.

14. The computing device of claim 11, wherein the entries define wireless MAPs communicatively coupled to one of RAPs, the RAPs being communicatively coupled to one of fabric edges (FEs), wireless client devices communicatively coupled to one of the wireless MAPs, and combinations thereof.

15. The computing device of claim 11, wherein the change to the first network location of the first entry comprises a change of the first network location of a first wireless MAP communicatively coupled from a first root AP to a second root AP.

16. The computing device of claim 11, the operations further comprising:
generating, for the entries, a list of wireless MAPs effected by the change to the first network location; and
updating network locations of the wireless MAPs based on the relational fields and the list of the wireless MAPS,
wherein the list of the wireless MAPs effected by the change to the first network location includes a client MAP server entry pointing to its respective MAP server entry, a first MAP server entry pointing to at least a second MAP server entry, and combinations thereof.

17. A non-transitory computer-readable medium storing instructions that, when executed, causes a processor to perform operations, comprising:
generating a map server database (DB) at a map server, the map server DB comprising relational fields for entries associated with access points;
determining a relational field indicating an identifier of a first entry, the relational field being associated with a second entry;
determining a network location change associated with a first network location of the first entry and to a second network location;
based at least in part on the network location change associated with the first network location of the first entry, updating a beacon to include an indication of the second network location such that the second network location is propagated to the access points; and
based at least in part on the relational field and the network location change associated with the first network location of the first entry, updating a third network location of the second entry to indicate the second network location.

18. The non-transitory computer-readable medium of claim 17, wherein the entries define wireless mesh access points (MAPs) communicatively coupled to one of root access points (RAPs), the RAPs being communicatively coupled to one of fabric edges (FEs), wireless client devices communicatively coupled to one of the wireless MAPs, and combinations thereof.

19. The non-transitory computer-readable medium of claim 17, wherein the change to the first network location of the first entry comprises a change of the first network location of a first wireless MAP communicatively coupled from a first RAP to a second RAP.

20. The non-transitory computer-readable medium of claim 17, the operations further comprising:
generating, for the entries, a list of wireless MAPs effected by the change to the first network location; and
updating network locations of the wireless MAPs based on the relational fields and the list of the wireless MAPS,
wherein the list of the wireless MAPs effected by the change to the first network location includes a client MAP server entry pointing to its respective MAP server entry, a first MAP server entry pointing to at least a second MAP server entry, and combinations thereof.

* * * * *